United States Patent

[11] 3,570,389

[72] Inventors Nicholas E. Pontecorvo
 Tarzana;
 Wilfred A. Shaffer, Los Angeles, Calif.
[21] Appl. No. 836,185
[22] Filed Apr. 16, 1969
 Division of Ser. No. 744,499, July 12, 1968, abandoned.
[45] Patented Mar. 16, 1971
[73] Assignee American Foods Machinery Corporation
 Memphis, Tenn.

[54] APPARATUS FOR PROCESSING PLASTICIZED CHEESE
 5 Claims, 2 Drawing Figs.
[52] U.S. Cl. .................................................. 99/243
[51] Int. Cl. ................................................ A23c 19/02
[50] Field of Search .................................. 99/115,
 116, 243; 31/46, 89; 100/55, 104

[56] References Cited
 UNITED STATES PATENTS
 3,120,443  2/1964  Berridge .......................  99/116
 3,394,011  7/1968  Richardson et al. ..........  99/243
 3,403,030  9/1968  Pontecorvo et al. ..........  31/89X
 3,445,241  5/1969  Pontecorvo et al. ..........  99/243X
 3,476,036  11/1969  Pontecorvo et al. ..........  99/116X Primary Examiner—Walter A. Scheel
Assistant Examiner—Leon G. Machlin
Attorney—John R. Walker, III ABSTRACT: Disclosed herein is apparatus for processing raw cheese curd into fine, plasticized, substantially homogeneous cheese such as Mozzarelli, wherein the curd is carried by a stainless steel conveyor belt through an elongated body of water which is heated by steam or hot water circulated in heat-exchange ducts in the bottom of the tank which holds the water; the curd, after being softened and moistened by the heated water, being elevated by its conveyor belt up an incline, out of the body of water and thence discharged over the end of the tank and downwardly onto a kneading belt which carries it beneath successive kneading rollers and finally delivers the fully processed cheese to a receiving apparatus such as an elevator or conveyor. Successive kneading rolls flatten the cheese into ribbon form. Between successive rolls the cheese ribbon is gathered and folded over upon itself preparatory to being again flattened beneath the next roll. Salt may be applied to the cheese ribbon at a suitable station along the kneading ribbon.

Patented March 16, 1971

INVENTORS
BY *Nicholas E. Pontecorvo*
*Wilfred A. Shaffer*
*John R. Walker, III*
ATTORNEY-

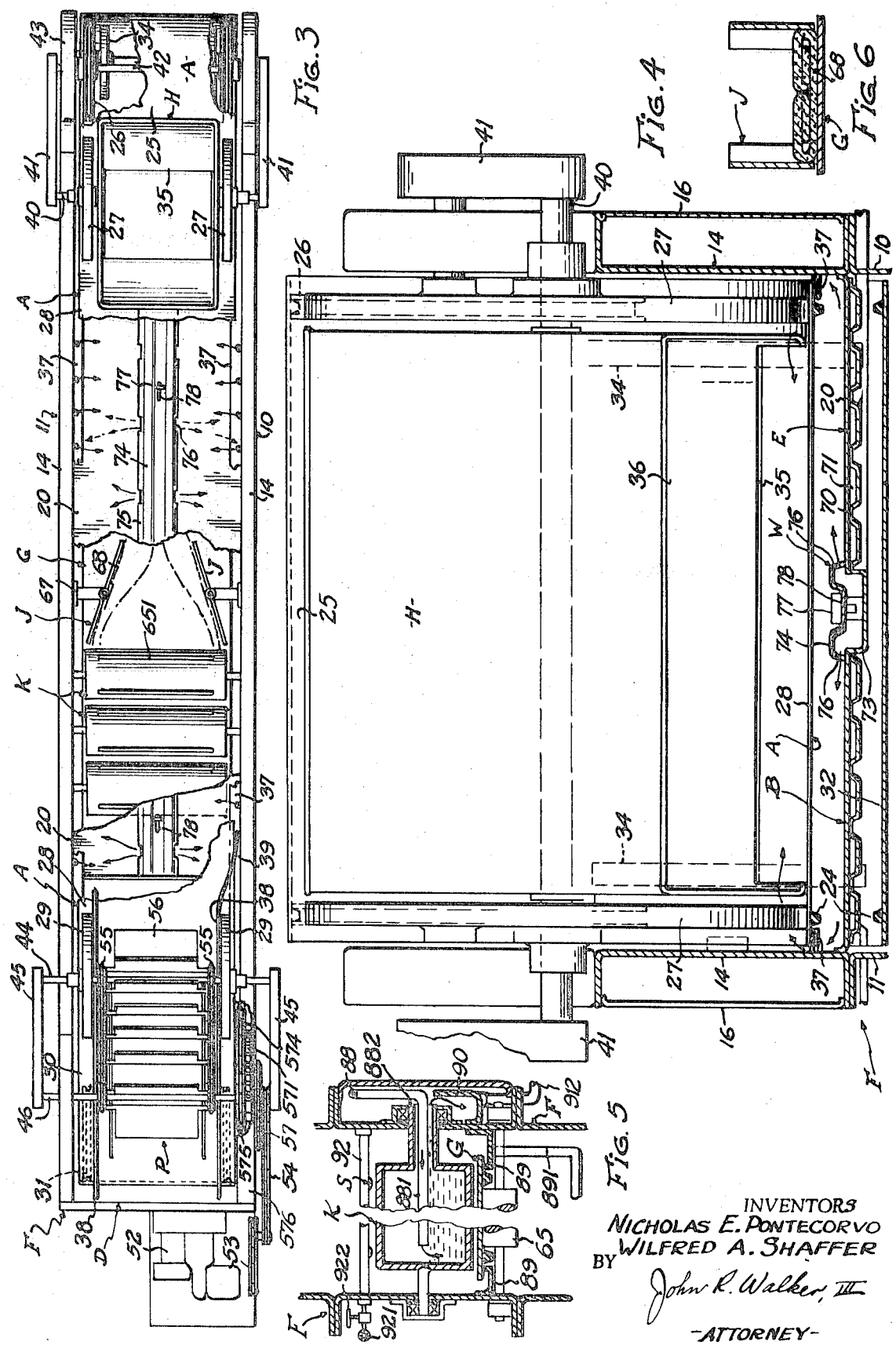

APPARATUS FOR PROCESSING PLASTICIZED CHEESE

This is a division of application Ser. No. 744,499, filed Jul. 12, 1968.

Said application Ser. No. 744,499 is a continuation-in-part, of our earlier applications Ser. No. 489,833, filed Sept. 24, 1965, now U.S. Pat. No. 3,403,030, issued Sept. 24, 1968, Method and Apparatus for Processing Cheese Curd into Plasticized Cheese, and Ser. No. 602,177, filed Dec. 12, 1966, now U.S. Pat. No. 3,445,241, issued May 20, 1969, Process and Apparatus for Producing Plasticized Cheese, wherein there is disclosed the processing or raw cheese curd into fine, plasticized cheese of Mozzarella grade, by subjecting raw cheese curd to the softening effect of hot water, conveying it on a conveyor belt beneath kneading rolls, and gathering the resulting cheese ribbon between gathering or folding devices.

BACKGROUND OF THE INVENTION

In the prior art, the common commercial method of processing homogeneous cheese such as Mozzarella, is a batch method wherein water at approximately 180° F. is added to a large batch of curd, and stirred until an average temperature of approximately 130° (the optimum temperature) is equalized throughout the batch of curd. However, before such equalization is attained, usually the curd in the outside of the batch is overcooked, resulting in driving off a considerable portion of its fat content and damaging the quality of the outer layers of curd before the stirring apparatus can fully mix the hot water into the internal area of the curd body. After the addition of the hot water to the curd, the batch is subjected to prolonged stirring to effect absorption of the water into the curd and to reduce the curd from nodule form to a more homogeneous, softened state. It is subsequently necessary to remove portions of the softened cheese body and to subject them to kneading operations to reduce the water content and to further compact the cheese body into the smooth, uniform, plasticized texture of Mozzarella and the other cheeses the hot of the plasticized type. After the plasticized cheese has been molded and cooled it is steeped in brine to add a required salt content, which requires steeping for an extended period of time.

In the patented art, Hensgen Pat. No. 2,768,083 discloses the kneading of cheese curd between gear-toothed rollers, Dzenis Pat. No. 2,840,909 discloses the use of an auger to draw a body of curd axially through a tubular passage. Mauk Pat. No. 3,117,008 discloses vat-stirring of the curd as in the commercial art outlined above, followed by overnight pressing in a hydraulic cheese press.

SUMMARY OF INVENTION

This invention is particularly characterized by the use of a continuous conveyor belt for conveying the curd first horizontally within a bath of heated water and then upwardly and out of the bath and over the end of the bath-containing tank; by the provision of means for elevating the conveyor belt above the tank for cleaning and sterilizing the belt and tank upon shutdown; by the embodiment of a heat exchanger on the tank bottom, and circulating steam or hot water therein for heating the bath; and by the circulation of the bath water laterally beneath the conveyor belt and above the heat-exchanger bottom for producing a flow of a thin stratum of water which is heated and then circulated laterally in oppositely directed streams which are deflected upwardly between the sides of the tank and the side edges of the belt and thence inwardly above the belt, whereby to contain the loose cheese curd upon the upper surface of the belt, inhibiting the escape of curd over the edges of the belt, while rapidly heating and softening it by direct contact of the heated streams against the curd.

A principal object of the invention is to provide apparatus for cheese processing wherein curd is first chopped in a curd mill into small pieces which are then softened by heat and moisture uniformly applied to a spreadout layer of the curd, and the softened curd is subsequently worked by kneading uniformly applied to a moving curd ribbon of limited depth. A further object is to provide apparatus wherein the softened curd, still in a relatively loose state, is lightly agglomerated by gravitational settling, into a matted body which is developed into a moving ribbon for kneading. Another object is to provide apparatus for an efficient kneading operation by moving the curd ribbon on a solidly supported belt beneath spaced kneading rolls which alternately flatten the ribbon and then allow it to thicken between rolls. A still further object is to provide apparatus for an intensified and fully controlled kneading operation on a moving belt comprising alternate horizontal and vertical kneading such as to effect highly effective kneading. By softening and then kneading the cheese in shallow, moving streams, the invention provides volume processing of a rapidity such as to reduce overall processing time from several days (required by the average batch process) to a time period as low as ten minutes, with a completely processed cheese such as Mozzarella, being delivered ready for packaging. A factor in attaining such rapidity is the provision for uniform dispersion of salt throughout the mass of cheese kneading thereof. This is accomplished by shaking dry salt into the curd during an intermediate stage of kneading sufficiently in advance of discharge of the completed product, so as to utilize the remaining stages of kneading to thoroughly work the salt into the cheese body.

Another object of the invention is to minimize fat loss. This is accomplished by:
 a. utilizing a softening bath only a few degrees hotter than the optimum softening temperature of the particular curd being processed, so as to minimize the melting of fat during the softening operation.
 b. limiting agitation of the softening bath relative to the curd to only the relative movement necessary to effect the lateral circulation mentioned above and to carry the curd through the bath on a slow-moving belt (e.g., traveling about 15 feet in about 5 minutes); and
 c. removing the softened curd from the bath before kneading, and kneading the curd with only a minimum amount of water present (e.g., the amount which remains adhering to the curd after removal from the bath, plus the minimum amount required for lubricating the kneading rolls). As a net result, the fat loss is drastically reduced as compared to the existing batch process commonly in use, and the fat content of the milk used in making the curd can be correspondingly reduced, for any legally required fat content in the finished product.

Specific objects of the invention are:
 1. to provide a machine for processing raw cheese curd into plasticized cheese of Mozarrella quality or equivalent, in a continuous rapid operation in which raw curd is fed continuously into a receiving area of the machine and fully processed cheese is delivered from a terminal area of the machine;
 2. to effect such operation automatically without the necessity for intervention by human hands;
 3. to easily maintain sterility and cleanliness in all phases of the processing operation and to facilitate cleaning and sterilization upon shutdown; and
 4. to effect the processing steps upon ribbons of curd and plasticized cheese carried upon conveyor belts and contained thereon against escape over the edges of the belts.

DESCRIPTION-GENERAL

These and other objects will become apparent in the ensuing specifications and appended drawings in which:

FIG. 3 is a plan view of the same;

FIG. 4 is a transverse vertical sectional view of the same;

FIG. 5 is a fragmentary axial sectional view of one of the kneading rolls; and

FIG. 6 is a fragmentary sectional view of a folding unit of the kneading section of the apparatus.

Figure 1:
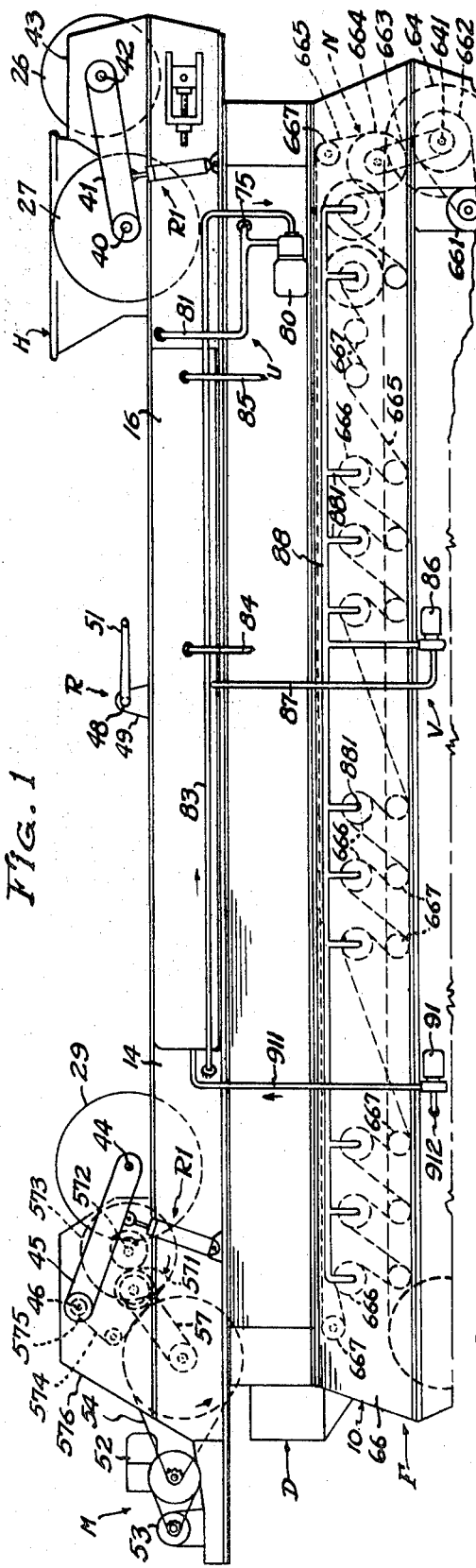
FIG. 1 is a side elevational view of a cheese processing machine embodying the invention.

Referring now to the drawings in detail, I have shown therein, as an example of one form of apparatus in which the invention may be carried out, a Mozzarella cheese processing machine embodying, in general, a frame F in which is supported a feed hopper H at a receiving end of the machine, to receive raw (cottage) cheese curd; and an upper conveyor belt A having a horizontal stretch to carry the curd through a heated water softening bath B1 in a tank B extending longitudinally in the upper area of frame F, and an elevator ramp stretch operable with the assistance of a paddle conveyor P to carry the softened curd out of the tank B, discharging it into a distributing hopper D at the other end of the machine. A water-circulation unit W is provided for circulating water laterally along the bottom of tank B, thence upwardly along the sides of the tank, thence inwardly over belt A. A heat-exchanger E, in the tank bottom, functions to heat the laterally spreading flows issuing from circulation unit W so that the stream flowing inwardly over belt A will heat-soften the layer of loose curd issuing from hopper H and carried on belt A.

The curd is delivered from distribution hopper D in a continuous stream onto a kneading belt G extending full length of the machine beneath the tank B. The stream of curd, initially of considerably less width than belt B, is flattened and kneaded into a web upon the belt G by a series of heated kneading rolls k arranged in longitudinally-spaced array above belt G for rotation on transverse axes, the curd web being carried beneath the rolls K by belt G. Rolls K are power-rotated to assist the belt G in carrying the curd forwardly.

Between the rolls K, the respective sides of the web are kneaded horizontally and folded inwardly onto the middle of the web, by folding blades J. A plurality of spray heads S are arranged to deliver fine mist sprays on the upper sides of kneading rolls K to inhibit adhesion of the cheese web to the rolls. Salting apparatus Z is automatically operable in response to passage of the curd web thereunder to sprinkle salt on the web, the salting apparatus including means sensing the web to control the salting.

The upper belt A and the paddle conveyor are driven by power drive mechanism M at the front end of the machine. The lower belt G and kneading rolls K are driven by power drive mechanism N at the rear end of the machine.

For facilitating the cleaning of belt A and tank B, belt-raising means R and belt-releasing means R1 are provided.

Water is circulated to duct W and to the bath B1 in tank B by a circulating system U. Hot water is circulated through kneading rolls K, to heat them, by a hot water system V.

DETAILED DESCRIPTION

Frame F includes respective side members 10 and 11 connected by suitable cross members including slide plates 12 on which the upper stretch of lower belt G is supported in sliding engagement with low-friction pads 13 of Teflon or equivalent low-friction material. In the upper level of the machine, slide members 10 and 11 include longitudinally extending channel beams 14 which are closed for a portion of their length by outer panels to provide water-preheating tanks 16. Beams 14 also constitute the sides of tank B.

Tank B is composed of the side frame beams 14, a bottom 20, an end member 21 extending upwardly behind hopper H, and an opposite end member 22 extending at a low angle to define a ramp along which the conveyor belt A elevates its load of curd out of the bath B1 of heated water.

Conveyor belt A is an endless ribbon of stainless steel sheet metal having V-belt rope guides 24 of rubber or equivalent, bonded to its inner face near its side margins, for guiding and traction coupling with the sheaves presently described. Belt A includes an entering stretch 25 which is guided downwardly over a laterally-spaced pair of guide sheaves 26 and thence beneath a pair of guide rollers 27 at opposite sides of hopper H, beneath which the belt is guided by rollers 27. From beneath the hopper the belt A extends in a horizontal carrying stretch 28 near the bottom of tank B, submerged in the heated water bath B1. As the belt approaches the ramp end 22 of the tank, it is guided upwardly beneath a pair of elevator-guide rollers 29, in an elevator stretch 30 which rises on an incline substantially paralleling ramp end 22, to a level above the rim of the tank, and thence downwardly and around a pair of drive sheaves 31. Beneath the tank B a return stretch 32, supported intermediate its ends by idler rollers 33, extends back to the receiving end of the machine and thence upwardly around idler rollers 34, to the sheaves 26. Rope guides 24 track in the sheaves 26, 31, the latter transmitting drive to belt A from drive mechanism M. Idler rollers 34 (FIG. 4) are positioned inwardly of rope guides 24 and bear against belt A between the rope guides.

Feed hopper H is narrower than belt A, sufficiently to clear the embracing rollers 27 which ride on the side-marginal areas of the upper surface of belt A. Hopper H has a heel portion 35 extending downwardly from its backwall, following the contour of belt stretch 25 at a slightly smaller radius than rollers 27. The bottom of the hopper is open, and cheese is deposited directly on the belt within the hopper, and then moves through a discharge vent 36 in the forward wall of the hopper, from which the curd flows in a layer of uniform depth on the belt A.

The side marginal portions of carrying stretch 28 of belt A ride upon Teflon-lined upper surfaces of bearing ledges 37 projecting inwardly beneath the belt from frame members 14. Ledges 37 are apertured for upward flow of water past the edges of the belt.

Curd-confining plates 28 are mounted above the elevator stretch 30 of belt A and have flared gathering portions 39 defining an entering portion of a space in which the curd is confined so as to pass between the guide rollers 29 without fouling them. At their opposite ends the plates 38 are curved downwardly around the loop of the belt passing around sheaves 31, the lower edges of the plates 38, 39 being fitted closely to the surface of belt A and following the contour thereof Rollers 27 are carried by a shaft 40 mounted on free ends of support arms 41 which, at their other ends, are mounted, for upwardly swinging movements, on the ends of the shaft 42 of sheaves 26. The hopper H is supported by shaft 40 and rises with the rollers 27 when elevated by arms 41. Shaft 42 is mounted in brackets 43 rising from frame channels 14. Rollers 29 are carried by a shaft 44 the ends of which are mounted in free ends of support arms 45 which at their other ends are mounted on a drive shaft 46 of paddle-conveyor P.

Raising units R1 are preferably hydraulic jacks, each pivotally anchored at its base to a frame beam 14 and having its piston rod pivotally attached to the underside of a respective support arm 41, 45.

Raising unit R comprises a pair of crank arms 47 secured to a crank shaft 48 which is mounted in brackets 49 on frame channels 14, and is provided at one or both ends with a crank lever 51. Crank arms 47 normally project downwardly into tank B, between the sides thereof and the edges of belt A, and are connected at their lower ends by a belt-raising bar 50 extending transversely beneath belt stretch 28 substantially midway between its two extremities.

Paddle conveyor P comprises shafts 46 and 44, pairs of sprocket and chain assemblies 55 on and between these shafts, and paddles 56 carried by assemblies 55. On the lower stretch of the conveyor P, paddles 56 travel in substantially synchronized, parallel relation to elevator stretch 30 of belt A so as to promote the upward flow of curd in its elevating travel out of and over the end of tank B.

Power drive M comprises a motor 52 driving through reduction gearing 53 and a chain and sprocket drive 54 to the shaft of drive sheaves 31, from which a sprocket and chain drive 57 drives through reversing-gears 571 to a countershaft 572 on which a sprocket 573 drives a chain 574 which in turn drives a sprocket 575 (FIG. 1 and 3) on shaft 46 of paddle conveyor P. Drive parts 57, 571, 53, 574 and 575 are covered by a housing 576 and hence are shown in phantom in FIG. 1.

A doctor blade 58, secured to and extending tranversely between the ends of side members of frame F, scrapes the cheese curd from the surface of belt A where it passes around sheaves 31 and directs the curd downwardly into distributing hopper D.

Distributing hopper D collects the softened curd discharged from conveyor A and spreads it upon supporting belt G in a continuous stream in the center of belt G. Initially this stream is narrow, it can be less than half the width of belt G, as determined by the width of mouth 60. Hopper D has a bottom inclined downwardly toward belt G, and a front wall the lower end of which is spaced above belt G to provide a distributing mouth 60 the depth of which can be modified by a vertically slidable gate 61 on the front wall. The hopper has a jacket 59 through which hot water is circulated, for maintaining the temperature of the curd.

Supporting belt G comprises an endless ribbon 62 of thin sheet material which can be stainless steel, traveling around rollers 63 and 64 at the respective ends of the machine. One or both rollers 63, 64 are driven by power drive mechanism N at a speed so related to the speed of conveyor A as to carry away the curd delivered through gap 60, at substantially the rate that the curd is discharged from conveyor A, in a layer of desirable depth (e.g. about 2½–3 inches before passing under the first kneading roller K).

Drive mechanism N, housed between a sectional gear cover 66 and the adjacent side 10 of frame F, comprises a motor 661 driving through a reduction gear and a sprocket and chain 662 to shaft 641 of lower belt rollers 64; and a sprocket and chain drive 663 to a drive sprocket 664 which drives through a chain 665 to a series of sprockets 666 on the shafts of kneading rolls K, the chain passing around various idler gears 667 in its travel between successive 666.

Kneading rolls K are arranged in groups of several (e.g. three) rolls to a group, and the groups are spaced apart, with the folding blades J interposed between the groups. Beneath each roll K the belt G is engaged by a supporting roller 65. Beneath the folding blades J, belt G is solidly supported by slide plates 12 in a flat plane, friction being minimized by the Teflon covering pads 13. The first roll K, adjacent hopper D, is at maximum spacing above belt G. Successive rolls K are spaced successively closer to belt G toward the discharge end thereof. Rolls K are provided with drive cleats 651 for assisting the flow of curd as carried by belt G, the peripheral speed of the rolls K being substantially matched to the linear speed of belt G.

The folding blades J are in the form of flat rectangular plate mounted to the side frame members 10 and 11 by brackets 67, in pairs, laterally-opposed, in diagonal positions, converging in the direction of travel of belt G (FIG. 3). Their lower edges are positioned in parallel, closely-adjacent relation the belt G so as to gather the marginal portions of the ribbon 68 of cheese carried by the belt and fold them inwardly upon the central portion of the ribbon.

Figure 2:
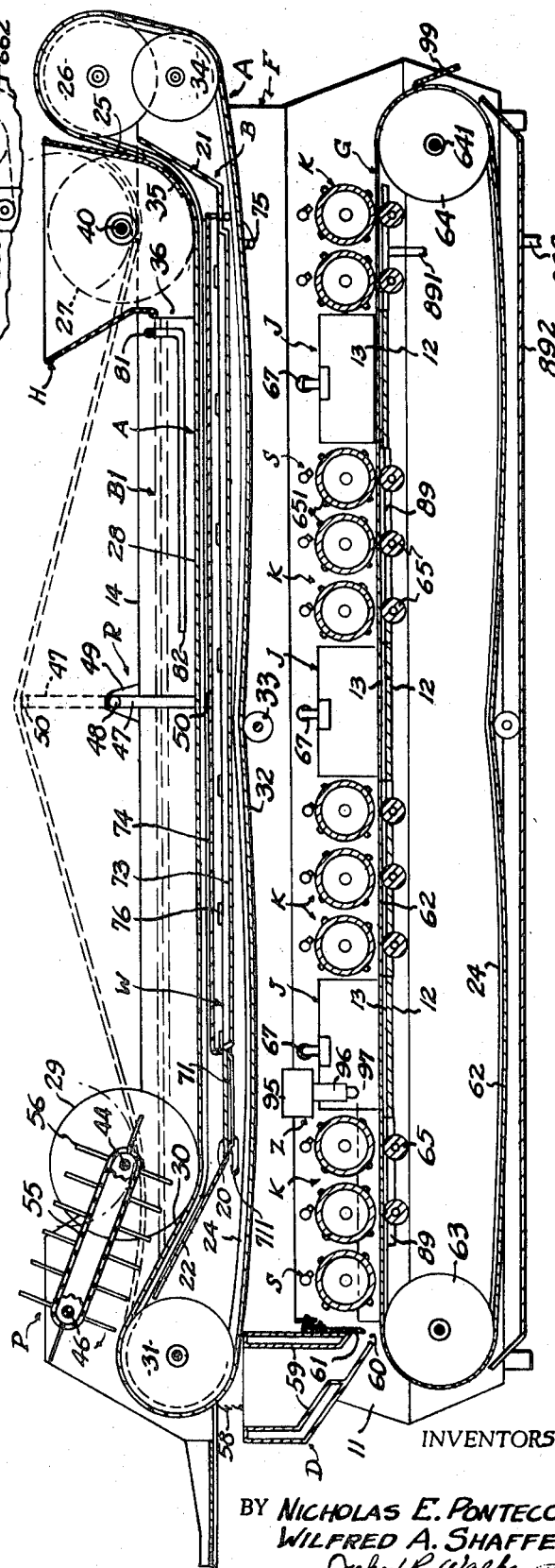
FIG. 2 is a longitudinal vertical sectional view of the same.

Heat exchanger E comprises a channeled metal sheet 70 welded or brazed to the bottom 20 of tank B and defining therewith a plurality of passages 71 into which steam is injected through a steam line 711 (FIG. 2) from a suitable source. Thus heat is transmitted through tank bottom 20 to the water flowing laterally from water circulation unit W.

Water circulation duct W comprises a channel 73 formed in the center of tank bottom 20 and extending longitudinally thereof, a cover channel 74 attached to channel 73 and having side flanges resting on tank bottom 20 along the sides of channel 73 to define the duct W, which receives water from an inlet 75 at one end of the duct. Outlet slots 76 in the side flanges of cover channel 74, spaced along the length thereof, emit streams of water along tank bottom 20 toward the respective sides of the tank, to develop the circulation of water outwardly beneath conveyor A, thence upwardly through apertured bearing ledges 37 and between the side margins of the conveyor and the tank sides 14, and thence inwardly over the layer of curd traveling on the conveyor. Cover channel 74 is detachably attached to channel 73 by turnbutton screws 77 extending through respective slots 78 in cover channel 74 and threaded into the bottom of channel 73.

Water circulating system U comprises a pump 80 having a discharge connected to distribution duct inlet 74 and, by means of a delivery line 81, to a perforated tube 82 (FIG. 2) extending longitudinally above the longitudinal medial axis of belt A, and embedded in the layer of curd carried therein, to deliver hot water directly into said layer when required. A return line 83 provides return flow from tank B near ramp 22, back to the inlet of pump 80. Thus the pump effects circulation of two flows into tank B, namely, a flow into the body of bath B1 from perforated tube 82, and transverse flows from distributing duct W, transversely around the cross section of belt A.

Hot water system V comprises two preheater tanks 16, a steam-injection line 84, for injecting live steam directly into the water in tanks 16, a replenishing inlet line 85 from a supply (e.g. city water system) and a pump 97 drawing heated water from tanks 16 through a return line 87 and distributing it into rolls K through a manifold 88. Manifold 88 (FIG. 5) includes a plurality of branch tubes 881 each extending into a respective roll K along the axis thereof through a hollow trunnion 882 on one end of the trunnion, and terminating near the opposite end of the roll where it discharges hot water into the roll, the water flowing back to the trunnion 882, from which it is discharged into a catch tray 90 from which it is pumped back to a tank 16 by a pump 91 (FIG. 1) through a return line 911, the pump draining the tray 90 through a drain line 912. Catch trays 89, extending longitudinally beneath the edges of belt G, collect the drippings from the belt. The drippings are drained off as waste through suitable drain lines 891. Alternatively, the drippings can be filtered to recover the fats carried thereby, and the residue water is then disposed of as waste. In some installations it may be desirable to optionally employ a supplemental catch tray 892 beneath the lower stretch of belt G, with a drain line 893 to drain off to waste, the drippings caught thereby.

Spray heads S are supplied with water from a fresh water supply (e.g. city water line) through a manifold 921, and branch lines 92. The sprays delivered from heads S are adjusted to the minimum required for lubricating the rolls K to prevent adhesion of the curd to the rolls. Valves 922 are provided for controlling the flows from manifold 921 to the branch spray lines 92.

Salting unit Z comprises a hopper 95 having a delivery spout 96 provided with a rotary valve which is normally closed or a switch which controls the energization of salt flow in a normally open circuit. A feeler 97 extends downwardly from the valve (or switch) to a point just clearing the belt G. When the advancing end of a new ribbon of cheese engages the feeler 97, the valve is opened or the salt flow circuit is energized, and salt commences to drop upon the cheese ribbon on belt G.

A doctor blade 99 scrapes the loop of belt G passing around rollers 64 below where the ribbon of processed cheese is transferred to a subsequent handling apparatus, and removes any cheese which may remain clinging to the belt.

PROCESSING OPERATION

Raw cheese curd is delivered by an elevator (not shown) or by other suitable means, into the hopper H, and drops directly onto the moving belt A, guided by hopper H and issuing from vent 36 in a layer of uniform, selected depth. Belt A carries the curd into bath B1. Bath B1 has hot water added to it from duct W as previously described, and excess overflows into return line 83 which returns it to the distributing duct W, through pump 80, and to tube 82 in the optional occasion when it is deemed advisable to use the same. As the stream of curd issuing from hopper H is slowly moved lengthwise of the tank on belt A, the streams of water issuing from the lateral outlets of duct W will spread beneath the belt A to the sides of the tank, thence upwardly and thence inwardly over the layer of curd carried by the belt, thus tending to sweep the curd toward the center of the belt and preventing any spilling of curd over the side margins of the belt. These laterally circulating streams of water are heated along the bottom of the tank by heat conducted from heat exchanger E, and upon flowing inwardly over the layer of curd on the belt, they will heat-soften the curd to a proper consistency for kneading on the lower belt G. Heat is also conducted directly from the heated streams beneath the belt A, upwardly through the belt and thence directly to the curd layer on the belt, by conduction. As the curd nears the end of the tank it is elevated on the ascending ramp portion 30 of the belt and carried over the sheaves 31 and then dropped into the distributing hopper D, in which it accumulates in the converging lower area thereof and then issues through the distributing mouth 60 in a stream of loosely agglomerated curd particles. The stream, of a depth of about 2½inches, and a width which may be about one-third the width of the belt G, more or less, is deposited on kneading belt G and is carried thereby beneath the first kneading roll K, beneath which it pressed into a thinner ribbon of matted curd particles. This ribbon is further thinned, compacted and widened beneath the next two rolls, and is then carried between the folding blades J which gather and fold the side portions of the ribbon toward the center thereof with a lateral kneading action, thereby narrowing and thickening the ribbon (FIG. 6). It is again kneaded, thinned and widened and then again gathered, folded and transversely kneaded beneath the successive sets of kneading rolls and the successive pairs of gathering blades J, and is gradually reduced to the dense, homogeneous state characteristic of Mozzarella cheese. At the discharge end of belt G the ribbon is removed by suitable mechanism and transferred to a molding machine or other subsequent handling means.

Water supplied to heating tanks 16 by fresh water supply line 85 through line 87, is pumped through manifold 88 and through kneading rolls K so as to heat the same, and is returned to tanks 16 by pump 91 and return line 911. The heated rolls maintain the cheese ribbon at the proper temperature for kneading.

Water temperature is controlled by conventional control means to effect maximum kneading efficiency. For Mozzarella, an optimum temperature is about 150° F.

We claim:

1. Apparatus for processing raw cheese curd into compact, homogeneous cheese, comprising:
    conveyor belt means;
    means for depositing on a first section of said conveyor belt means a layer of raw cheese curd;
    means associated with said first section for softening said curd, the softened curd being delivered to a second section of said conveyor belt means while in a softened condition;
    successive kneading rolls disposed above and contiguous to a second section of said conveyor belt means, for kneading the softened curd into a continuous ribbon upon said second section;
    a horizontal softening tank providing a heated bath in which said first belt section is arranged to travel to effect said softening;
    a heat exchanger in conducting relation to the bottom of said tank, for heating the water contiguous to said bottom; and
    a distributing duct extending along the longitudinal axis of said tank bottom and having vents for circulating flows of water laterally along said bottom beneath said first belt section to the sides of the tank, thence upwardly and inwardly above said first belt section, said flows tending to sweep the lateral portions of said layer of raw curd inwardly and to thereby minimize escape of curd over the edges of said first belt section.

2. Apparatus as defined in claim 1, wherein said tank embodies double-walled sides defining water-heating tanks, and including means for injecting live steam into said heating tanks, whereby the water therein, and the sides of said softening tank, are heated.

3. Apparatus for processing raw cheese curd into compact, homogeneous cheese, comprising:
    conveyor belt means;
    means for depositing on a first section of said conveyor belt means a layer of raw cheese curd;
    means associated with said first section for softening said curd, the softened curd being delivered to a second section of said conveyor belt means while in a softened condition;
    successive kneading rolls disposed above and contiguous to a second section of said conveyor belt means, for kneading the softened curd into a continuous ribbon upon said second section;
    an elongated horizontal softening tank for holding a heated bath in which said first belt section has a carrying stretch arranged to carry said raw curd in said bath for effecting said softening, said stretch having an end for receiving raw curd and an opposite end for discharging softened curd;
    guide rollers at respective ends of said tank, beneath which said carrying stretch travels so as to maintain the same substantially straight and submerged at a uniform depth in said bath;
    means mounting said rollers for raising and lowering movements; and
    means operable on said mounting means for raising said rollers to loosen said carrying stretch to facilitate cleaning.

4. Apparatus for processing raw cheese curd into compact, homogeneous cheese, comprising:
    conveyor belt means;
    means for depositing on a first section of said conveyor belt means a layer of raw cheese curd;
    means associated with said first section for softening said curd, the softened curd being delivered to a second section of said conveyor belt means while in a softened condition;
    successive kneading rolls disposed above and contiguous to a second section of said conveyor belt means, for kneading the softened curd into a continuous ribbon upon said second section;
    an elongated horizontal softening tank for holding a heated bath in which said first belt section has a carrying stretch arranged to carry said raw curd in said bath for effecting said softening, said carrying stretch having an end for receiving raw curd and an opposite end for discharging softened curd;
    guide rollers at respective ends of said tank, beneath which said carrying stretch travels so as to maintain the same substantially straight and submerged at a uniform depth in said bath;
    means mounting said rollers for raising and lowering movements;
    means operable on said mounting means for raising said rollers to loosen said carrying stretch to facilitate cleaning; and
    means engageable beneath said carrying stretch intermediate its ends and operable to elevate the same above said softening tank to facilitate cleaning of said tank and said belt means.

5. Apparatus for processing raw cheese curd into compact, homogeneous cheese, comprising:
    conveyor belt means;
    means for depositing on a first section of said conveyor belt means a layer of raw cheese curd;
    means associated with said first section for softening said curd, the softened curd being delivered to a second section of said conveyor belt means while in a softened condition;
    successive kneading rolls disposed above and contiguous to a second section of said conveyor belt means, for kneading the softened curd into a continuous ribbon upon said second section;

an elongated horizontal softening tank for holding a heated bath in which said first belt section has a carrying stretch arranged to carry said raw curd in said bath for effecting said softening, said carrying stretch having an end for receiving raw curd and an opposite end for discharging softened curd; and guide rollers at respective ends of said tank, beneath which said carrying stretch travels so as to maintain the same substantially straight and submerged at a uniform depth.